United States Patent
Belling (10) Patent No.: US 12,526,607 B2
(45) Date of Patent: Jan. 13, 2026

(54) POLICY CONTROL FOR 5G MULTICAST-BROADCAST SERVICES (5MBS)

(71) Applicant: NOKIA TECHNOLOGIES OY, Espoo (FI)

(72) Inventor: Horst Thomas Belling, Erding (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 260 days.

(21) Appl. No.: 18/021,083

(22) PCT Filed: Jul. 9, 2021

(86) PCT No.: PCT/EP2021/069143
§ 371 (c)(1),
(2) Date: Feb. 13, 2023

(87) PCT Pub. No.: WO2022/033782
PCT Pub. Date: Feb. 17, 2022

(65) Prior Publication Data
US 2023/0319511 A1  Oct. 5, 2023

Related U.S. Application Data

(60) Provisional application No. 63/064,167, filed on Aug. 11, 2020.

(51) Int. Cl.
*H04W 4/06* (2009.01)
*H04L 12/18* (2006.01)
(52) U.S. Cl.
CPC ............. *H04W 4/06* (2013.01); *H04L 12/189* (2013.01)

(58) Field of Classification Search
CPC ....................................................... H04W 4/06
USPC ............................................................ 370/312
See application file for complete search history.

(56) References Cited

U.S. PATENT DOCUMENTS

2019/0158985 A1   5/2019   Dao et al.

FOREIGN PATENT DOCUMENTS

WO   WO-2009082978 A1 *  7/2009   ......... H04L 12/2856

OTHER PUBLICATIONS

3rd Generation Partnership Project Stage 2 Release Aug. 16, 2020 V 16.5.1 (Year: 2020).*

(Continued)

*Primary Examiner* — Sibte H Bukhari
(74) *Attorney, Agent, or Firm* — Carter, DeLuca & Farrell LLP (57) ABSTRACT

Systems, methods, apparatuses, and computer program products of policy control for 5G multicast-broadcast services (5MBS) are provided. One method may include, when a multicast distribution session begins, selecting, by an ingress node, a control node for the multicast distribution session. The method may also include attempting to establish a policy association for the multicast distribution session with the control node, receiving a failure reply from the control node for establishing the policy association including an identifier of an already assigned second control node, establishing a policy control association related to the multicast distribution session with the second control node, providing the identifier (ID) of the multicast distribution session to the second control node, and receiving policies related to the multicast distribution session from the second control node.

1 Claim, 6 Drawing Sheets

(56) References Cited

OTHER PUBLICATIONS

International Search Report & Written Opinion dated December 8, 2021corresponding to International Patent Application No. PCT/EP2021/069143.
3GPP TS 23.501 V16.5.1 (Aug. 2020), Technical Specification, 3rd Generation Partnership Project; Technical Specification Group Services and System Aspects; System architecture for the 5G System (5GS); Stage 2 (Release 16), Aug. 2020.
3GPP TS 23.502 V16.5.1 (Aug. 2020), Technical Specification, 3rd Generation Partnership Project; Technical Specification Group Services and System Aspects; Procedures for the 5G System (5GS); Stage 2 (Release 16), Aug. 2020.
3GPP TS 23.503 V16.5.1 (Aug. 2020), Technical Specification, 3rd Generation Partnership Project; Technical Specification Group Services and System Aspects; Policy and charging control framework for the 5G System (5GS); Stage 2 (Release 16), Aug. 2020.

3GPP TR 23.757 V0.4.0 (Jun. 2020), Technical Report, 3rd Generation Partnership Project; Technical Specification Group Services and System Aspects; Study on architectural enhancements for 5G multicast-broadcast services (Release 17), Jun. 2020.
Invitation to Pay Additional Fees received for corresponding Patent Cooperation Treaty Application No. PCT/EP2021/069143, dated Sep. 22, 2021, 21 pages.
"Discussion and proposal on the PCC part of configuration procedure in clause 7.1.1", SA WG2 Meeting #S2-145E, S2-2104993, Agenda Item: 8.9, ZTE, May 17-28, 2021, pp. 1-8.
"3rd Generation Partnership Project; Technical Specification Group Services and System Aspects; Architectural enhancements for 5G multicast-broadcast services; Stage 2 (Release 17)", 3GPP TS 23.247 V17.5.0, Dec. 2022, pp. 1-115.
Office action received for corresponding European Patent Application No. 21743165.9, dated Mar. 6, 2025, 15 pages.

* cited by examiner

POLICY CONTROL FOR 5G MULTICAST-BROADCAST SERVICES (5MBS)

CROSS-REFERENCE TO RELATED APPLICATIONS

This application claims priority from U.S. provisional patent application No. 63/064,167 filed on Aug. 11, 2020. The entire contents of this earlier filed application are hereby incorporated by reference in their entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods of policy control for 5G multicast-broadcast services (5MBS).

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

One embodiment may be directed to a method that may include, when a multicast distribution session begins, selecting, by an ingress node, a control node for the multicast distribution session. The method may further include attempting to establish a policy association for the multicast distribution session with the control node, receiving a failure reply from the control node for establishing the policy association including an identifier of an already assigned second control node, establishing a policy control association related to the multicast distribution session with the second control node, providing the identifier (ID) of the multicast distribution session to the second control node, and receiving policies related to the multicast distribution session from the second control node.

An embodiment may be directed to a method that may include receiving at a control node, from an ingress node controlling a multicast distribution session, the identifier (ID) of the multicast distribution session, storing, in a support node, the identifier (ID) of the control node, optionally storing a control node set ID, and/the multicast distribution session ID to indicate that the control node provides policy control for the multicast distribution session, receiving, from a network function, an input for policy decisions related to the multicast distribution session, and providing, based on the received input, updated policies related to the multicast distribution session to the ingress node.

An embodiment may be directed to a method that may include, when an input for policy decisions related to a multicast distribution session is available, requesting or inquiring, from a support node, information on a control node assigned for handling the multicast distribution session. When there is a control node assigned to handle the multicast distribution session, the method may include receiving the identifier (ID) of the control node assigned to handle the multicast distribution session and possibly a set ID from the support node. The method may further include providing, to the control node received from the support node, the input for policy decisions related to the multicast distribution session.

An embodiment may be directed to a method that may include receiving at a support node, from an control node providing policies for a multicast distribution session, the identifier (ID) of the multicast distribution session and the identifier (ID) of the control node, optionally a control node set ID and storing those identifiers and that they are related. The method may also include receiving a request from a network function for the control node assigned for handling the multicast distribution session and, when there is a control node assigned to handle the multicast distribution session, providing the identifier (ID) of the control node assigned to handle the multicast distribution session and when stored also the control node set ID to the network function.

An embodiment may be directed to an apparatus that may include at least one processor and at least one memory comprising computer program code. The at least one memory and computer program code configured, with the at least one processor, to cause the apparatus at least to perform: when a multicast distribution session begins, selecting a control node for the multicast distribution session; attempting to establish a policy association for the multicast distribution session with the control node; receiving a failure reply from the control node for establishing the policy association including an identifier of an already assigned second control node; establishing a policy control association related to the multicast distribution session with the second control node; providing the identifier (ID) of the multicast distribution session to the second control node; and receiving policies related to the multicast distribution session from the second control node.

An embodiment may be directed to an apparatus that may include at least one processor and at least one memory comprising computer program code. The at least one memory and computer program code configured, with the at least one processor, to cause the apparatus at least to perform: receiving, from an ingress node controlling a multicast distribution session, the identifier (ID) of the multicast distribution session; storing, in a support node, the identifier (ID) of the apparatus, optionally storing a control node set ID, and/the multicast distribution session ID to indicate that the apparatus provides policy control for the multicast distribution session; receiving, from a network function, an input for policy decisions related to the multicast distribution session; and providing, based on the received input, updated policies related to the multicast distribution session to the ingress node.

An embodiment may be directed to an apparatus that may include at least one processor and at least one memory comprising computer program code. The at least one memory and computer program code configured, with the at least one processor, to cause the apparatus at least to perform: when an input for policy decisions related to a multicast distribution session is available, requesting or inquiring, from a support node, information on a control node assigned for handling the multicast distribution session; when there is a control node assigned to handle the multicast distribution session, receiving the identifier (ID) of the control node assigned to handle the multicast distribution session and possibly a set ID from the support node; and providing, to the control node received from the support node, the input for policy decisions related to the multicast distribution session.

An embodiment may be directed to an apparatus that may include at least one processor and at least one memory comprising computer program code. The at least one memory and computer program code configured, with the at least one processor, to cause the apparatus at least to perform: receiving, from a control node providing policies for a multicast distribution session, the identifier (ID) of the multicast distribution session and the identifier (ID) of the control node, optionally a control node set ID and storing those identifiers and that they are related; receiving a request from a network function for the control node assigned for handling the multicast distribution session; and when there is a control node assigned to handle the multicast distribution session, providing the identifier (ID) of the control node assigned to handle the multicast distribution session and when stored also the control node set ID to the network function.

An embodiment may be directed to an apparatus including, when a multicast distribution session begins, means for selecting a control node for the multicast distribution session. The apparatus may also include means for attempting to establish a policy association for the multicast distribution session with the control node, means for receiving a failure reply from the control node for establishing the policy association including an identifier of an already assigned second control node, means for establishing a policy control association related to the multicast distribution session with the second control node, means for providing the identifier (ID) of the multicast distribution session to the second control node, and means for receiving policies related to the multicast distribution session from the second control node.

An embodiment may be directed to an apparatus including means for receiving, from an ingress node controlling a multicast distribution session, the identifier (ID) of the multicast distribution session. The apparatus may also include means for storing, in a support node, the identifier (ID) of the apparatus, optionally storing a control node set ID, and/the multicast distribution session ID to indicate that the apparatus provides policy control for the multicast distribution session. The apparatus may further include means for receiving, from a network function, an input for policy decisions related to the multicast distribution session, and means for providing, based on the received input, updated policies related to the multicast distribution session to the ingress node.

An embodiment may be directed to an apparatus including, when an input for policy decisions related to a multicast distribution session is available, means for requesting or inquiring, from a support node, information on a control node assigned for handling the multicast distribution session. When there is a control node assigned to handle the multicast distribution session, the apparatus may include means for receiving the identifier (ID) of the control node assigned to handle the multicast distribution session and possibly a set ID from the support node. The apparatus may also include means for providing, to the control node received from the support node, the input for policy decisions related to the multicast distribution session.

An embodiment may be directed to an apparatus including means for receiving, from a control node providing policies for a multicast distribution session, the identifier (ID) of the multicast distribution session and the identifier (ID) of the control node, optionally a control node set ID and means for storing those identifiers and that they are related. The apparatus may also include means for receiving a request from a network function for the control node assigned for handling the multicast distribution session and, when there is a control node assigned to handle the multicast distribution session, means for providing the identifier (ID) of the control node assigned to handle the multicast distribution session and when stored also the control node set ID to the network function.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products of policy control for 5G multicast-broadcast services (5MBS), is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Architectural enhancements for 5G multicast-broadcast services (5MBS) are described in 3$^{rd}$ Generation Partnership Project (3GPP). Competing baseline architectures 1 and 2 in 3GPP may include a user plane function (UPF) controlled by a session management function (SMF) to distribute multicast content. In certain cases, an N4 interface and related packet forwarding control protocol (PFCP) may be defined between the UPF and SMF.

Architecture 1 may include a multicast service function user plane (MSF-U) controlled by a multicast service function control plane (MSF-C), and architecture 2 may include a multicast/broadcast user plane (MBSU) controlled by a multicast/broadcast service function (MBSF) for similar tasks. Both architectures may resemble a split broadcast-multicast service center (BM-SC), and it is expected that an interface and protocol similar to N4/PFCP may be used between those entities. In addition, a CP function may be defined as MSF-C, network exposure function (NEF), MBSF, or SMF. Furthermore, a UP function may be defined as a UPF, MSF-U, or MBSU.

Figure 1:
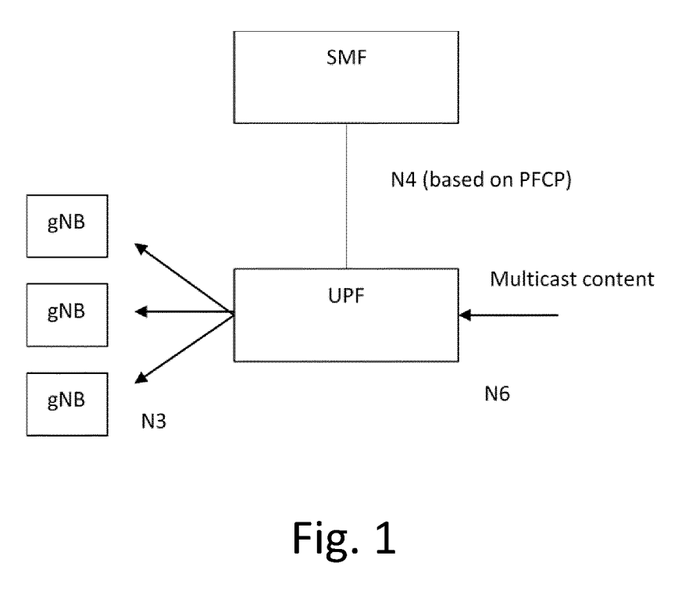
FIG. 1 illustrates an example 5G multicast-broadcast architecture, according to an embodiment.

FIG. 1 illustrates an example 5G multicast-broadcast architecture. As illustrated in the example of FIG. 1, the UPF may need to send multicast content to downstream entities (e.g., 5G AN), such as a wireline access gateway function (W-AGF) for wireline access, or radio access network (RAN) node such as a gNB. Moreover, in some instances, both unicast and multicast delivery of the multicast content may be needed. In addition, related N4 procedures and PFCP extensions may need to be defined. Furthermore, the UPF may receive multicast content over N6 via point to point (P2P) or multicast/broadcast (P2M). As further illustrated in FIG. 1, the SMF may be able to control the UPF delivery of the multicast content over N3 to the 5G AN entities. Policy control function (PCF) is assumed in baseline architecture 1, but details of PCF interaction have yet to be defined.

One outstanding issue relates to quality of service (QOS) level support for multicast and broadcast communication services. Different multicast and broadcast communication services have potentially different QoS requirements. For this issue, QoS requirements, including packet error rate, delay budget, MBR or GBR, may be analyzed. In addition, if a need for different QoS levels is determined by the QoS requirement analysis, then it may be determined how to provide a means to support the identified QoS levels, which network function (NF) determines the QoS levels of multicast and broadcast services, and/or which entity should enforce the required QoS and how.

An application function (AF) can provide input to policies, such as QoS requirements and description of media, for a multicast session. These inputs may be provided either before a multicast session starts or during the multicast session. Related policy control is assumed to be controlled by the PCF. The PCF may need to obtain inputs to policy control both for ongoing multicast sessions and when multicast session starts. A single PCF should be selected for policy control for multicast session. In some deployments, the PCF may be collocated or located in proximity of SMFs (that can be ingress core node).

According to certain example embodiments, when receiving a request to establish a policy control association related to the multicast session or an input for policy decisions related to a multicast session, the PCF may store, in a binding support function (BSF), its own identifier (ID) and possible set ID and the multicast distribution session ID to indicate that it provides policy control for the multicast distribution session.

In an embodiment, when an AF and/or NEF has input for policy decisions related to a multicast session, the AF or NEF may inquire, at the BSF, which PCF is handling that multicast session by providing the multicast session ID as input. The AF or NEF may then send the input for the policy decision to the appropriate PCF as provided by the BSF. The PCF may then provide updated policies to the ingress core node controlling the multicast distribution session.

Figure 2:
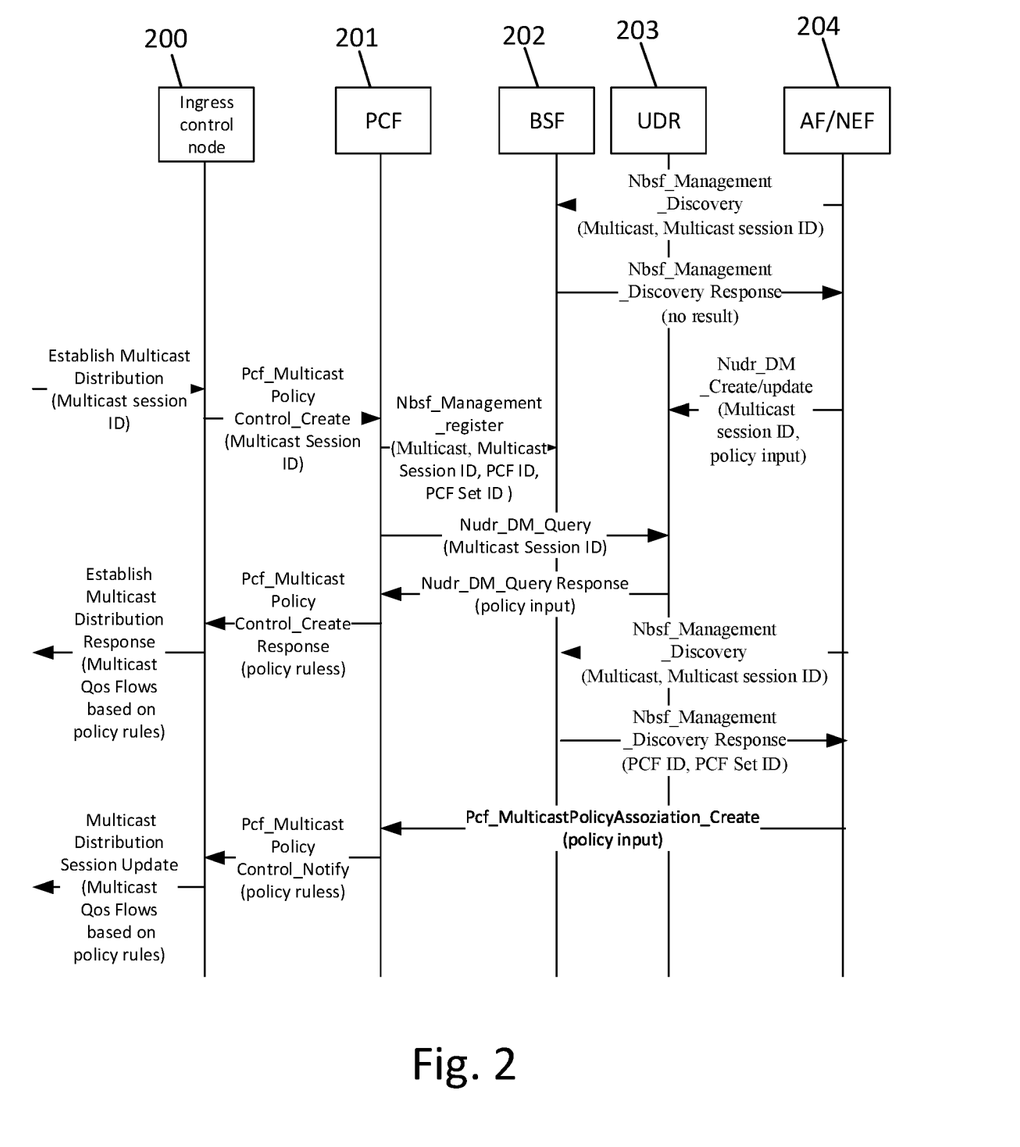
FIG. 2 illustrates an example signaling flow diagram, according to one example embodiment.

FIG. 2 illustrates an example signaling flow diagram, according to an example embodiment. As illustrated in the example of FIG. 2, when a multicast distribution session starts, the ingress core node 200 controlling the multicast distribution session (e.g., SMF, BM-SC) may select a PCF 201, establish a policy control association related to the multicast session with the PCF 201, and provide the identity of the multicast distribution session ID (e.g. multicast address) to the PCF 201. When receiving a request to establish a policy control association related to the multicast session or an input for policy decisions related to a multicast session, the PCF 201 may store, in the BSF, its own ID and possible set ID and the multicast distribution session ID to indicate that it provides policy control for the multicast distribution session.

In an example embodiment, the BSF 202 may reply to the registration with an error indicating that there is already a PCF registered for the multicast session. The PCF 201 may then reject the policy control association and provide an error or redirect response to the ingress core node 200 indicating the new PCF.

In an example embodiment, when the AF/NEF 204 has input for policy decisions related to a multicast session, the AF/NEF 204 may inquire at the BSF 202 whether there is already an assigned PCF handling that multicast session, providing the multicast session ID as input. If there is already an assigned PCF, the BSF 202 may provide the PCF ID and possible PCF set ID, and the ingress core node 200 may then establish a policy control association related to the multicast session with the PCF 201. If there is no assigned PCF handling that multicast session, the ingress core node 200 may select a PCF and may establish a policy control association related to the multicast session with the PCF 201.

In an example embodiment, an AF may provide input to the policy decisions for the multicast session, such as media descriptions of QoS requirements. An AF outside the public land mobile network (PLMN) may provide that input towards an NEF, which may check whether the AF is authorized to provide such input and then act on behalf of the AF. An AF inside the PLMN can provide the input directly.

When the AF/NEF 204 has input for policy decisions related to a multicast session, it may inquire, from the BSF 202, the PCF handling that multicast session. For example, the AF/NEF 204 may provide the multicast session ID to the BSF 202 as input and receive the PCF ID or PCF set ID from the BSF 202. The AF/NEF 204 may then send the input for the policy decision to the PCF 201 provided by the BSF. The PCF 201 may then provide updated policies to the ingress core node 200 controlling the multicast distribution session.

In an embodiment, if the BSF 202 does not return a stored PCF, the AF/NEF 204 may just store the input for policy decision in the UDR 203. In a variant, the AF/NEF 204 may select a PCF and may send input to the policy decision for the multicast session to that PCF.

In addition, according to an embodiment, when the AF/NEF 204 has input for policy decisions related to a multicast session, it may store that input in the UDR 203. According to certain embodiments, when a policy control association related to the multicast session is established, the PCF 201 may read stored input for policy decisions related to a multicast session from the UDR 203. In an embodiment, the PCF may also subscribe at the UDR 203 for notifications about changes of the input for policy decisions of the multicast session.

Figure 3:
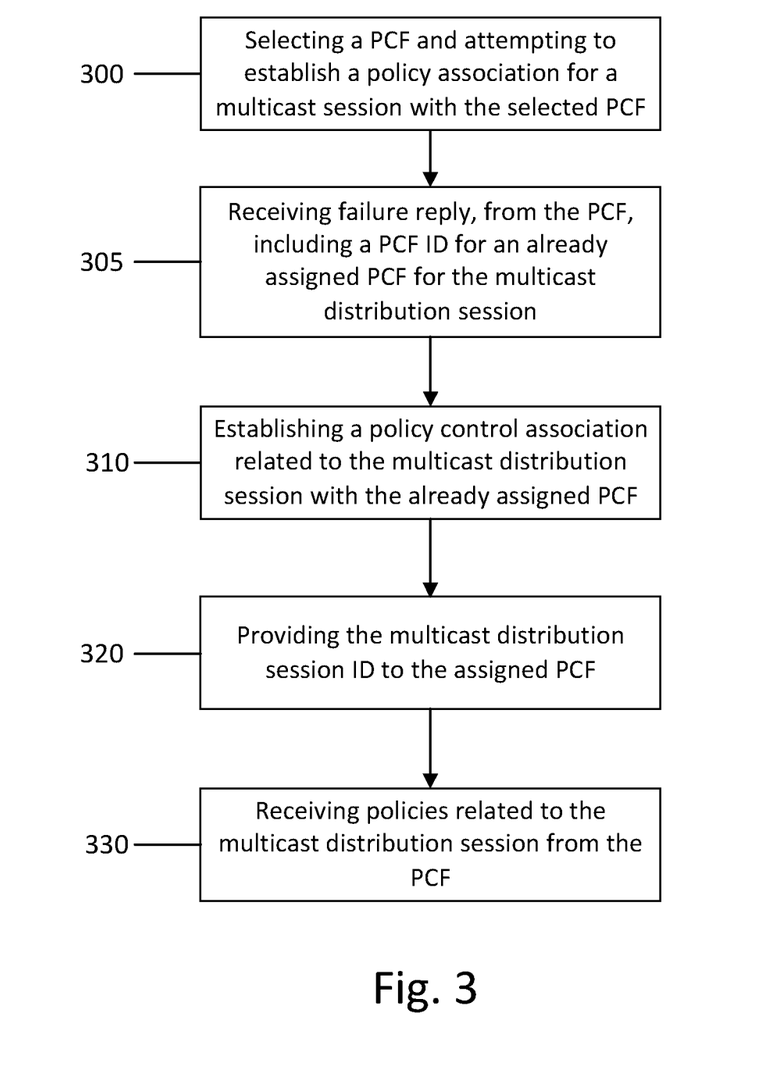
FIG. 3 illustrates an example flow diagram of a method, according to one example embodiment.

FIG. 3 illustrates an example flow diagram of a method of policy control for 5MBS, according to one example embodiment. In certain example embodiments, the flow diagram of FIG. 3 may be performed by a network entity or network node in a communications system, such as LTE or 5G NR. In some example embodiments, the network entity performing the method of FIG. 3 may include an ingress core node or ingress control node, such as a SMF or BM-SC, or the like. For instance, in one example embodiment, the method of FIG. 3 may be performed by an ingress node controlling a multicast distribution session, such as the ingress control node 200 depicted in the example signaling flow diagram of FIG. 2.

In an example embodiment, as illustrated in the example of FIG. 3, a method may include, at 300, when a multicast distribution session begins, selecting a PCF and attempting to establish a policy association for the multicast distribution session with the selected PCF. At 305, the method may include receiving a failure reply from the PCF for establishing the policy association including a PCF ID for an already assigned PCF for the multicast distribution session and optionally a PCF set ID.

According to an example embodiment, the method may include, at 310, establishing a policy control association related to the multicast distribution session with the already assigned PCF. In an embodiment, the method may include, at 320, providing the ID of the multicast distribution session, such as a multicast address, to the assigned PCF. In certain embodiments, the method may include, at 330, receiving policies related to the multicast distribution session from the assigned PCF.

Figure 4:
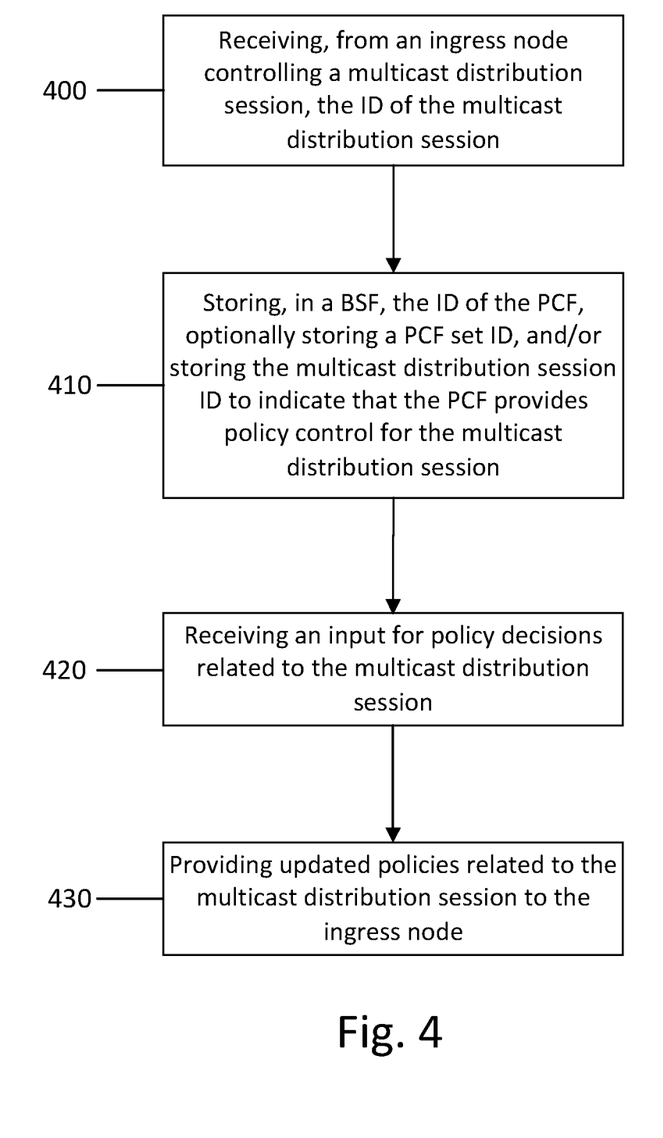
FIG. 4 illustrates an example flow diagram of a method, according to one example embodiment.

FIG. 4 illustrates an example flow diagram of a method of policy control for 5MBS, according to one example embodiment. In certain example embodiments, the flow diagram of FIG. 4 may be performed by a network entity or network node in a communications system, such as LTE or 5G NR. In some example embodiments, the network entity performing the method of FIG. 4 may include a control node, such as a PCF, or the like. For instance, in one example embodiment, the method of FIG. 4 may be performed by a PCF, such as the PCF 201 depicted in the example signaling flow diagram of FIG. 2.

In an example embodiment, as illustrated in the example of FIG. 4, a method may include, at 400, receiving, from an ingress node controlling a multicast distribution session, the ID of the multicast distribution session, such as a multicast address. According to an example embodiment, the receiving 400 may include receiving, from the ingress node, a request to establish a policy control association related to the multicast distribution session. In one example embodiment, if there is already another PCF registered for the multicast distribution session, the method may include receiving an error indication from a BSF indicating that there is already a PCF registered for the multicast session, and rejecting the policy control association, e.g., by providing an error or redirect response to the ingress node indicating the already registered PCF.

According to some example embodiments, the method may include, at 410, storing, in a BSF, the ID of the PCF, optionally storing a PCF set ID, and/or the multicast distribution session ID to indicate that the PCF provides policy control for the multicast distribution session. In an example embodiment, when a policy control association related to the multicast distribution session is established, the method may include reading stored input for policy decisions related to the multicast distribution session from a UDR. In certain example embodiments, the method may include subscribing at the UDR for notifications about changes of input for the policy decisions of the multicast distribution session.

According to an example embodiment, the method may include, at 420, receiving, e.g., from an AF/NEF, an input for policy decisions related to the multicast distribution session. In certain embodiments, the method may include, at 430, providing, based on the received input, updated policies related to the multicast distribution session to the ingress node.

Figure 5:
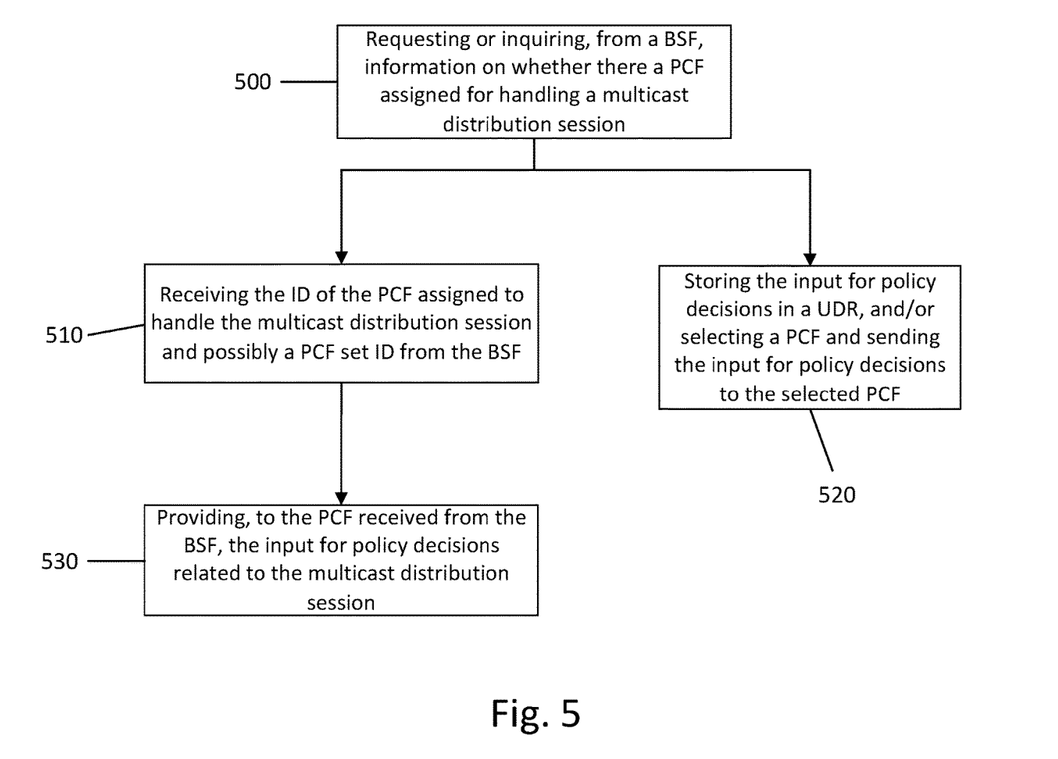
FIG. 5 illustrates an example flow diagram of a method, according to one example embodiment.

FIG. 5 illustrates an example flow diagram of a method of policy control for 5MBS, according to one example embodiment. In certain example embodiments, the flow diagram of FIG. 5 may be performed by a network entity or network node in a communications system, such as LTE or 5G NR. In some example embodiments, the network entity performing the method of FIG. 5 may include a network node or function, such as an AF or NEF, or the like. For instance, in one example embodiment, the method of FIG. 5 may be performed by a AF/NEF, such as the AF/NEF 204 depicted in the example signaling flow diagram of FIG. 2.

In an example embodiment, as illustrated in the example of FIG. 5, a method may include, when an input for policy decisions related to a multicast distribution session is available, at 500, requesting or inquiring, from a BSF, information on whether there is a PCF assigned for handling the multicast distribution session. For example, the requesting or receiving 500 may include using the multicast session ID to inquire, from the BSF, whether there is a PCF assigned for handling the multicast distribution session identified by the multicast session ID. If there is a PCF assigned to handle the multicast distribution session, then the method may include, at 510, receiving the ID of the PCF assigned to handle the multicast distribution session and possibly a PCF set ID from the BSF.

According to an example embodiment, the method may include, at 530, providing, to the PCF received from the BSF, the input for policy decisions related to the multicast distribution session. In an example embodiment, the input for policy decisions may include media descriptions of QoS requirements. In some example embodiments, if the AF providing the input is outside the PLMN, then the providing 530 may include first providing the input to a NEF that checks whether the AF is authorized to provide such input and, if authorized, the NEF providing the input to the PCF.

In a further example embodiment, if there is not a PCF assigned to handle the multicast distribution session (e.g., the BSF does not return an ID of a stored PCF), the method may include, at 520, storing the input for policy decisions in a UDR. Additionally or alternatively, the method may also include selecting a PCF and sending the input for policy decisions to the selected PCF.

Figure 6A:
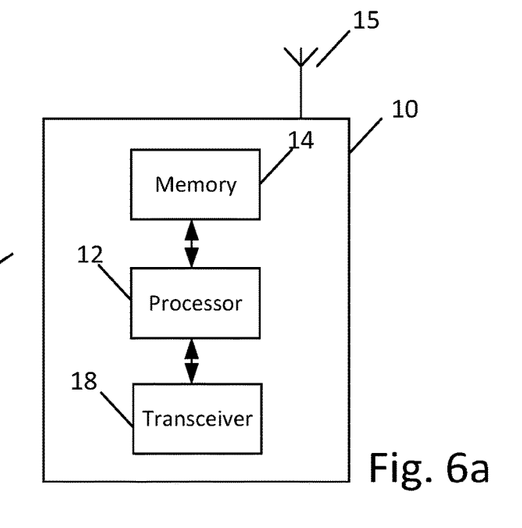
FIG. 6a illustrates an example block diagram of an apparatus, according to one example embodiment.

FIG. 6a illustrates an example of an apparatus 10 according to an example embodiment. In an example embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 10 may be NG-RAN node, an eNB in LTE, transmission/reception point (TRP) or gNB in 5G. According to some example embodiments, apparatus 10 may represent an ingress control node.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 6a.

As illustrated in the example of FIG. 6a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 6a, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. In certain example embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources. In certain examples, processor 12 may be configured as a processing means or controlling means for executing any of the procedures described herein.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein. In certain example embodiments, memory 14 may be configured as a storing means for storing any information or instructions for execution as discussed elsewhere herein.

In an example embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some example embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. In certain example embodiments, transceiver 18 may be configured as a transceiving means for transmitting or receiving information as discussed elsewhere herein. Additionally or alternatively, in some example embodiments, apparatus 10 may include an input and/or output device (I/O device) or means.

In an example embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some example embodiments, processor 12 and memory 14 may be included in or may form a part of processing circuitry or control circuitry. In addition, in some example embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain example embodiments, apparatus 10 may be a network node or RAN node, such as a base station, access point, Node B, eNB, gNB, WLAN access point, or the like. According to some example embodiments, apparatus 10 may represent an ingress control node. For example, in some example embodiments, apparatus 10 may be configured to perform one or more of the processes depicted in any of the flow charts or signaling diagrams described herein. In some example embodiments, as discussed herein, apparatus 10 may be configured to perform a procedure relating to policy control in 5MBS, for instance.

According to certain example embodiments, apparatus 10 may be controlled by memory 14 and processor 12 to, when a multicast distribution session starts, select a PCF and attempt to establish a policy association for the multicast distribution session with the selected PDF. In an embodiment, apparatus 10 may be controlled by memory 14 and processor 12 to receive a failure reply from the PCF for establishing the policy association including a PCF ID for an already assigned PCF for the multicast distribution session and optionally a PCF set ID.

According to an example embodiment, apparatus 10 may be controlled by memory 14 and processor 12 to establish a policy control association related to the multicast distribution session with the already assigned PCF. In an embodiment, apparatus 10 may be controlled by memory 14 and processor 12 to provide the ID of the multicast distribution session, such as a multicast address, to the assigned PCF. In certain embodiments, apparatus 10 may be controlled by memory 14 and processor 12 to receive policies related to the multicast distribution session from the assigned PCF.

Figure 6B:
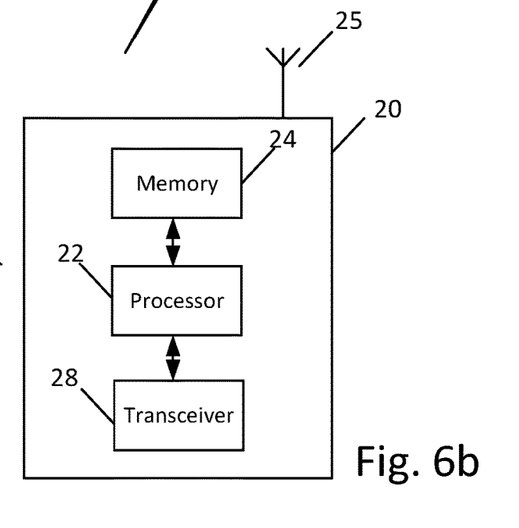
FIG. 6b illustrates an example block diagram of an apparatus, according to one example embodiment.

FIG. 6b illustrates an example of an apparatus 20 according to another example embodiment. In an example embodiment, apparatus 20 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 10 may be NG-RAN node, an eNB in LTE, or gNB in 5G. According to some example embodiments, apparatus 20 may represent a control node or PCF, for example.

In some example embodiments, apparatus 20 may include one or more processors, one or more computer-readable storage medium (for example, memory, storage, or the like), one or more radio access components (for example, a modem, a transceiver, or the like), and/or a user interface. In some example embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 6b.

As illustrated in the example of FIG. 6b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6b, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an example embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some example embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other example embodiments, transceiver 28 may be capable of transmitting and receiving signals or data directly. Additionally or alternatively, in some example embodiments, apparatus 20 may include an input and/or output device (I/O device). In certain example embodiments, apparatus 20 may further include a user interface, such as a graphical user interface or touchscreen.

In an example embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 or apparatus 30 via a wireless or wired communications link or interface 70 according to any radio access technology, such as NR.

According to some example embodiments, processor 22 and memory 24 may be included in or may form a part of processing circuitry/means or control circuitry/means. In addition, in some embodiments, transceiver 28 may be included in or may form a part of transceiving circuitry or transceiving means.

As discussed above, according to some example embodiments, apparatus 20 may be network node, access node, or control node, such as a PCF, for example. According to certain example embodiments, apparatus 20 may be controlled by memory 24 and processor 22 to perform the functions associated with example embodiments described herein. For example, in some example embodiments, apparatus 20 may be configured to perform one or more of the processes depicted in any of the flow charts or signaling diagrams described herein, such as those illustrated in FIG. 2 or 4. In certain example embodiments, apparatus 20 may include or represent a PCF. In one example embodiment, apparatus 20 may represent the PCF 201 illustrated in the example of FIG. 2. According to an example embodiment, apparatus 20 may be configured to perform a procedure relating to policy control in 5MBS, for instance.

In certain example embodiments, apparatus 20 may be controlled by memory 24 and processor 22 to receive, from an ingress node controlling a multicast distribution session, the ID of the multicast distribution session, such as a multicast address. According to an example embodiment, apparatus 20 may be controlled by memory 24 and processor 22 to receive, from the ingress node, a request to establish a policy control association related to the multicast distribution session. In one example embodiment, if there is already another PCF registered for the multicast distribution session, apparatus 20 may be controlled by memory 24 and processor 22 to receive an error indication from a BSF indicating that there is already a PCF registered for the multicast session, and to reject the policy control association, e.g., by providing an error or redirect response to the ingress node indicating the already registered PCF.

According to some example embodiments, apparatus 20 may be controlled by memory 24 and processor 22 to store, in a BSF, the ID of the PCF, optionally store a PCF set ID, and/or to store the multicast distribution session ID to indicate that the apparatus 20 provides policy control for the multicast distribution session. In an example embodiment, when a policy control association related to the multicast distribution session is established, apparatus 20 may be controlled by memory 24 and processor 22 to read stored input for policy decisions related to the multicast distribution session from a UDR. In certain example embodiments, apparatus 20 may be controlled by memory 24 and processor 22 to subscribe at the UDR for notifications about changes of input for the policy decisions of the multicast distribution session.

According to an example embodiment, apparatus 20 may be controlled by memory 24 and processor 22 to receive, e.g., from an AF/NEF, an input for policy decisions related to the multicast distribution session. In certain embodiments, apparatus 20 may be controlled by memory 24 and processor 22 to provide, based on the received input, updated policies related to the multicast distribution session to the ingress node.

Figure 6C:
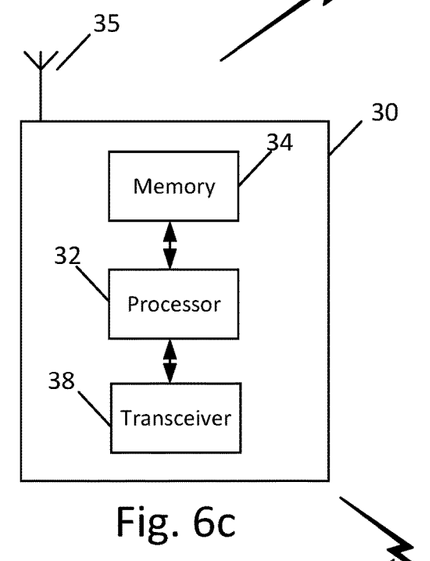
FIG. 6c illustrates an example block diagram of an apparatus, according to one example embodiment.

FIG. 6c illustrates an example of an apparatus 30 according to another example embodiment. In an example embodiment, apparatus 30 may be a node, host, or server in a communications network or serving such a network. For example, apparatus 30 may be a satellite, base station, a Node B, an evolved Node B (eNB), 5G Node B or access point, next generation Node B (NG-NB or gNB), access node, control node, and/or WLAN access point, associated with a radio access network, such as a LTE network, 5G or NR. In example embodiments, apparatus 30 may be NG-RAN node, an eNB in LTE, transmission/reception point (TRP) or gNB in 5G. According to some example embodiments, apparatus 30 may represent an application function (AF) and/or network exposure function (NEF), for instance.

In some example embodiments, apparatus 30 may include one or more processors, one or more computer-readable storage medium (for example, memory, storage, or the like), one or more radio access components (for example, a modem, a transceiver, or the like), and/or a user interface. In some example embodiments, apparatus 30 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus 30 may include components or features not shown in FIG. 6c.

As illustrated in the example of FIG. 6c, apparatus 30 may include or be coupled to a processor 32 for processing information and executing instructions or operations. Processor 32 may be any type of general or specific purpose processor. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 32 is shown in FIG. 6c, multiple processors may be utilized according to other example embodiments. For example, it should be understood that, in certain example embodiments, apparatus 30 may include two or more processors that may form a multiprocessor system (e.g., in this case processor 32 may represent a multiprocessor) that may support multiprocessing. In certain example embodiments, the multiprocessor system may be tightly coupled or loosely coupled (e.g., to form a computer cluster).

Processor 32 may perform functions associated with the operation of apparatus 30 including, as some examples, precoding of antenna gain/phase parameters, encoding and decoding of individual bits forming a communication message, formatting of information, and overall control of the apparatus 30, including processes related to management of communication resources.

Apparatus 30 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 34 can be comprised of any combination of random access memory (RAM), read only memory (ROM), static storage such as a magnetic or optical disk, hard disk drive (HDD), or any other type of non-transitory machine or computer readable media. The instructions stored in memory 34 may include program instructions or computer program code that, when executed by processor 32, enable the apparatus 30 to perform tasks as described herein.

In an example embodiment, apparatus 30 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 32 and/or apparatus 30.

In some example embodiments, apparatus 30 may also include or be coupled to one or more antennas 35 for receiving a downlink signal and for transmitting via an uplink from apparatus 30. Apparatus 30 may further include a transceiver 38 configured to transmit and receive information. The transceiver 38 may also include a radio interface (e.g., a modem) coupled to the antenna 35. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 38 may be configured to modulate information on to a carrier waveform for transmission by the antenna(s) 35 and demodulate information received via the antenna(s) 35 for further processing by other elements of apparatus 30. In other example embodiments, transceiver 38 may be capable of transmitting and receiving signals or data directly. Additionally or alternatively, in some example embodiments, apparatus 30 may include an input and/or output device (I/O device). In certain example embodiments, apparatus 30 may further include a user interface, such as a graphical user interface or touchscreen.

In an example embodiment, memory 34 stores software modules that provide functionality when executed by processor 32. The modules may include, for example, an operating system that provides operating system functionality for apparatus 30. The memory may also store one or more functional modules, such as an application or program, to provide additional functionality for apparatus 30. The components of apparatus 30 may be implemented in hardware, or as any suitable combination of hardware and software. According to an example embodiment, apparatus 30 may optionally be configured to communicate with apparatus 10 via a wireless or wired communications link 71 and/or to communicate with apparatus 20 via a wireless or wired communications link 72, according to any radio access technology, such as NR.

According to some example embodiments, processor 32 and memory 34 may be included in or may form a part of processing circuitry or control circuitry. In addition, in some example embodiments, transceiver 38 may be included in or may form a part of transceiving circuitry.

As discussed above, according to some example embodiments, apparatus 30 may be a network node, such as an AF and/or NEF, for instance. According to certain example embodiments, apparatus 30 may be controlled by memory 34 and processor 32 to perform the functions associated with example embodiments described herein. For instance, in some example embodiments, apparatus 30 may be configured to perform one or more of the processes depicted in any of the diagrams or signaling flow diagrams described herein. As an example, apparatus 30 may correspond to or represent an AF/NEF, such as the AF/NEF 204 illustrated in the example of FIG. 2. According to certain example embodiments, apparatus 30 may be configured to perform a procedure relating to policy control in 5MBS, for instance.

According to an example embodiment, apparatus 30 may be controlled by memory 34 and processor 32 to, when an input for policy decisions related to a multicast distribution session is available, request or inquire, from a BSF, information on whether there a PCF assigned for handling the multicast distribution session. For example, apparatus 30 may be controlled by memory 34 and processor 32 to use the multicast session ID to inquire, from the BSF, whether there is a PCF assigned for handling the multicast distribution session identified by the multicast session ID. If there is a PCF assigned to handle the multicast distribution session, apparatus 30 may be controlled by memory 34 and processor 32 to receive the ID of the PCF assigned to handle the multicast distribution session and possibly a PCF set ID from the BSF.

According to an example embodiment, apparatus 30 may be controlled by memory 34 and processor 32 to provide, to the PCF received from the BSF, the input for policy decisions related to the multicast distribution session. In an example embodiment, the input for policy decisions may include media descriptions of QoS requirements. In some example embodiments, if apparatus 30 is outside the PLMN, then apparatus 30 may be controlled by memory 34 and processor 32 to first provide the input to a NEF that checks whether the apparatus 30 is authorized to provide such input and, if authorized, the NEF may be configured to provide the input to the PCF.

In a further example embodiment, if there is not a PCF assigned to handle the multicast distribution session (e.g., the BSF does not return an ID of a stored PCF), apparatus 30 may be controlled by memory 34 and processor 32 to store the input for policy decisions in a UDR. Additionally or alternatively, apparatus 30 may be controlled by memory 34 and processor 32 to select a PCF and send the input for policy decisions to the selected PCF.

Furthermore, it should be noted that an apparatus, according to certain example embodiments, may include means or functions for performing any of the procedures described herein.

Therefore, certain example embodiments provide several technological improvements, enhancements, and/or advantages over existing technological processes and constitute an improvement at least to the technological field of wireless network control and management. For example, as discussed in detail in the foregoing, certain example embodiments provide methods of policy control for a multicast session. As a result, example embodiments are able to provide for potentially different QoS requirements for different multicast sessions. Some example embodiments enable a PCF to provide updated policies to an ingress core node controlling a multicast distribution session. Accordingly, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

I claim:

1. An apparatus, comprising:
    at least one processor; and
    at least one memory comprising computer program code,
    the at least one memory and computer program code configured, with the at least one processor, to cause the apparatus at least to perform:
        receiving, from an ingress node controlling a multicast distribution session, an identifier (ID) of the multicast distribution session, wherein the receiving of the multicast distribution session ID comprises receiving, from the ingress node, a request to establish a policy control association related to the multicast distribution session, wherein the ingress node comprises a session management function (SMF);
        if there is already another control node registered for the multicast distribution session, receiving an error indication from a support node indicating that there is already a control node registered for the multicast distribution session, and rejecting the policy control association, wherein the rejecting comprises providing an error or redirect response to the ingress node indicating the already registered control node, wherein the error or redirect response includes a policy control function ID and a policy control function set ID of the control node;
        storing, in the support node, an ID of the apparatus, a control node set ID, and the multicast distribution session ID to indicate that the apparatus provides policy control for the multicast distribution session, wherein the multicast distribution session comprises a multicast address;

when a policy control association related to the multicast distribution session is established, reading stored input for policy decisions related to the multicast distribution session from a unified data repository;

subscribing at the unified data repository for notifications about changes of input for the policy decisions of the multicast distribution session;

receiving, from a network function, an input for policy decisions related to the multicast distribution session, wherein the network function is an application function; and providing, based on the received input, updated policies related to the multicast distribution session to the ingress node.

\* \* \* \* \*